(12) United States Patent
Clark (10) Patent No.: US 6,601,855 B1
(45) Date of Patent: Aug. 5, 2003

(54) SEAL FOR A UNIVERSAL JOINT

(76) Inventor: Keith A. Clark, 35 Summer St., #39, Northfield, NH (US) 03276

( * ) Notice: Subject to any disclaimer, the term of this patent is extended or adjusted under 35 U.S.C. 154(b) by 0 days.

(21) Appl. No.: 09/339,006

(22) Filed: Jun. 23, 1999

Related U.S. Application Data (60) Provisional application No. 60/103,857, filed on Oct. 12, 1998.

(51) Int. Cl.[7] ................................................. F16J 15/32
(52) U.S. Cl. ........................ 277/549; 277/561; 277/569; 464/133
(58) Field of Search ................................ 464/131, 133; 277/549, 555, 558, 560, 561, 562, 569

(56) References Cited

U.S. PATENT DOCUMENTS

| | | | |
|---|---|---|---|
| 3,901,049 A | * | 8/1975 | Hersovici |
| 4,094,517 A | | 6/1978 | Aucktor |
| 4,844,484 A | * | 7/1989 | Antonini et al. ............. 277/561 |
| 5,026,324 A | * | 6/1991 | Schurger et al. ............ 464/131 |
| 5,597,356 A | | 1/1997 | Rieder |
| 5,716,277 A | | 2/1998 | Reynolds |
| 6,050,571 A | * | 4/2000 | Rieder et al. ............ 464/131 X |
| 6,095,925 A | * | 8/2000 | Smith ...................... 464/133 X |

* cited by examiner

Primary Examiner—Robert J. Sandy
Assistant Examiner—Karlena D. Schwing (57) ABSTRACT

A universal joint seal for retaining lubricant therein. The seal cooperates to form a static seal with the trunnion and a static seal with the bearing cup and permits relative angular movement between the trunnion and bearing cup through a flexible web portion. The seal optionally permits venting of pressure within the grease cavity formed between the trunnion and bearing cup. The seal also has a passage communicating with the grease cavity. The seal has an outward facing lip seal that provides a fluid barrier to the migration of lubricant out of the passage. In response to a moderate pressure level within the grease cavity, the lip moves away from the contacting surface so as to vent the moderate pressure within the grease cavity out of the sealed region and to prevent an excessive pressure differential from developing across the lip. Several alternate embodiments permitting venting of pressure from the grease cavity are disclosed.

30 Claims, 11 Drawing Sheets

SEAL FOR A UNIVERSAL JOINT

CROSS REFERENCE TO RELATED APPLICATION

This application claims priority from U.S. Patent Application No. 60/103,857, filed Oct. 12, 1998.

BACKGROUND OF THE INVENTION

Technical Field

This invention generally relates to seals for universal joints and in particular to an improved seal which permits limited relative movement between the trunnion and bearing cup and forms a static seal between the trunnion and the bearing cup.

Universal joints are structures which are well known and usually include a cross member having a central body portion with four turnings extending outwardly therefrom. The trunnions extend at right angles relative to one another and lie in a single plane. A central bore is provided in each trunnion forming an opening in the end of the trunnion opposite the central body portion. A hollow cylindrical bearing cup, closed at one end, is disposed over the open end of each of the trunnions. Roller bearings are provided between each of the bearing cups and its associated trunnion such that the bearing cups are rotatably mounted thereon. It is known to provide the open ends of the bearing cups with elastomeric seals which are typically positioned between the trunnion and bearing cup to form a seal therebetween. Normally, the seals provide for complete rotational movement between the trunnion and the bearing cup. Because complete relative movement is provided for, there are compromises in the seal design which permit some slight leakage of lubricant past the seals. Additionally, such seals must resist the entry of contaminants into the bearings. One prior art configuration, commonly known as a lip seal, has been used to accomplish both tasks.

This seal has the disadvantage that while it is possible to initially lubricate the universal joint by passing lubricant over the sealing lip. Once these lips run dry they will not receive any further supply of lubricant. Thus, the sealing lip will wear out due to the lack of lubricant.

Another problem that occurs in the assembly process of the seal between the trunnion and bearing cup is that lubricant is typically applied to the bearing cup and roller bearings prior to assembly with the trunnion. This procedure can cause air to become trapped within the sealed bearing cavity resulting in a build-up of pressure in the bearing cavity during assembly. A pressure build-up in the sealed region can press out the seal which can cause the loss of lubricant and ingress of contaminants, resulting in bearing failure.

Furthermore, during operation of the universal joint, heat is generated by the bearings and this causes the lubricant, trapped air or moisture to increase in temperature. Because lubricants are primarily composed of a mixture of various hydrocarbons, some hydrocarbons can form gases as temperatures increase. These gases plus any trapped air or moisture cause the pressure in the sealed bearing cavity to increase. If this pressure increase is not vented, the seal can be pressed out. This condition can cause bearing failure by permitting the loss of lubricant and the ingress of contaminants.

SUMMARY OF THE INVENTION

It is an object of the invention to provide a static elastomeric seal between the trunnion and bearing cup and permit limited rotational or relative movement between the trunnion and bearing cup.

It is a further object to provide a flexible rubber web between the trunnion and bearing cup and yet provide a static seal against the trunnion and a static seal against the bearing cup.

It is still a further object of the present invention to provide a static seal against the trunnion and a static seal against the bearing cup which provides for limited relative movement between the trunnion and bearing cup and which permits purging of trapped air in the lubricant cavity during assembly.

An additional object is to provide an elastomeric rubber web between the trunnion and bearing cup and permit purging of pressure out of the lubricant cavity to prevent seal blow-out.

Still another object of the present invention is to provide static seals against the trunnion and bearing cup, a web between the trunnion and bearing cup and an excluder seal to prevent contamination from entering the main seal.

The seal for a universal joint which consists of a trunnion and a bearing cup in spaced relation to the trunnion. The trunnion and bearing cup further define a cavity for retaining lubricant therein. The seal includes an inner portion, an outer portion and a flexible web portion. The inner portion is adjacent to the trunnion. The outer portion is adjacent to the bearing cup. The flexible web portion permits limited movement of the trunnion relative to the bearing cup. Optionally, the elastomer member has a lip portion so that in one predetermined condition, the lip portion forms a barrier to the passage of lubricant from the cavity and in response to a slight increase in pressure within the cavity, the lip separates to prevent an excessive differential from developing across the lip. Upon venting the pressure, the lip returns to sealing contact.

These and other objects and features of the invention will become apparent from the description and especially taken in conjunction with the accompanying drawings illustrating the invention and embodiments.

BRIEF DESCRIPTION OF THE DRAWINGS

The various advantages of the present invention will become apparent to one skilled in the art upon reading the following specification and by reference to the drawings which include.

DETAILED DESCRIPTION OF THE PREFERRED EMBODIMENTS

As used herein, the term "excess pressure" means a build up of pressure in a cavity which is above ambient pressure and is of a sufficient pressure to move or push the seal off from the bearing cup or sufficient pressure to have an adverse effect on bearing performance. Normal pressure is between ambient to slight pressure above ambient pressure. Moderate pressure is between normal and excess pressure but is insufficient to push the seal off the bearing cup.

As used herein the term "axially extending" means in the direction of the axis of rotation of the bearings. The term "radially extending" means in the direction away from the axis of rotation of the bearings. The term "overmolding" means the entire rigid support member is covered with elastomeric material. The term "elastomeric material" includes polymeric material such as silicone, polyacrylate, nitrile, hydrogenated nitrile, ethylene acrylate, fluorocarbon polymers or any other similar suitable material.

Figure 1:
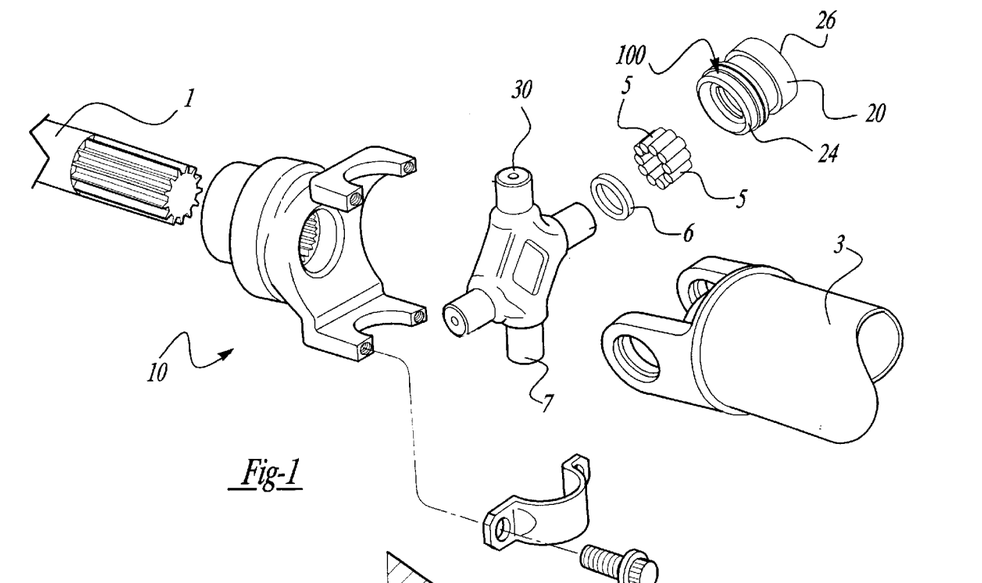
FIG. 1 is a perspective, blow-up view of a universal joint according to the present invention.
Figure 2:
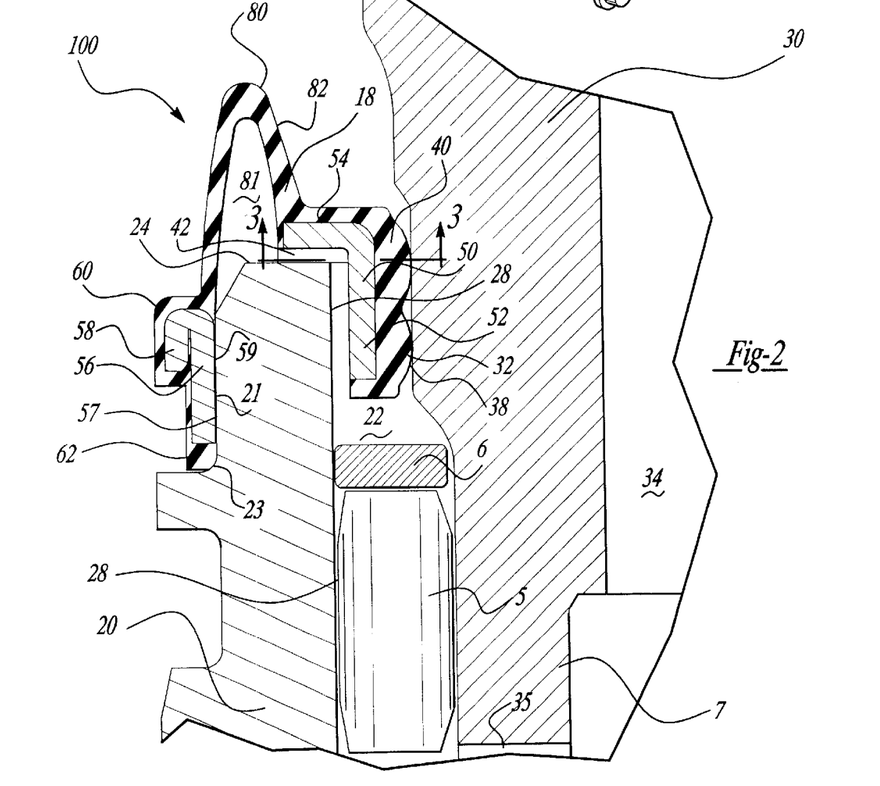
FIG. 2 is a partial cross-sectional view of the preferred embodiment of a seal for a universal joint according to the invention.

A universal joint 10 includes an input shaft 1, a four lobed spider 7, an output shaft 3, a plurality of roller bearings 5 rotatably mounted on four equally spaced trunnions 30 extending outwardly, a resinous washer 6, a bearing cup and a seal 100 as depicted in FIG. 1. The preferred embodiment of the seal according to the invention is designated by the numeral 100, as best shown in FIG. 2.

The seal 100 includes a rubber body 18 which includes an inner diameter portion 40, an outer diameter portion 60, and a flexible web portion 80. The rubber body 18 of the seal 100 is made of an elastomeric material. The inner diameter portion 40 is rigidly supported by a generally L-shaped case 50 which has an axially extending section 52 and a radially extending section 54.

The inner diameter portion 40 is adjacent to the trunnion 30 and is over molded with the elastomer material of the rubber body 18. The rubber surface on the portion 40 forms a static seal 38 against the surface 32 of the trunnion 30. A plurality of equally spaced rubber or elastomeric bumpers 42 are rigidly supported by the radially extending section 54 of the case 50. In between the bumpers 42 are passages 25 to permit flow communication to the cavity 22 for a purpose to be described later on herein. Preferably, the passages 25 are generally rectangular in cross-sectional shape. However, alternatively the passage shape may be quadrilateral, sawtoothed, sinusoidal, triangular or the like, as shown in FIGS. 3a, 3b, 3c, and 3d, which permits flow communication between the cavity 22 and enclosure 81.

Returning to FIG. 2, the innermost surface of each of the bumpers 42 is positioned against one end 24 of the bearing cup 20 to locate the seal inner portion 40 relative to the surface 32. The inner surfaces of the bumpers 42 are initially contiguous with one end 24 of the bearing cup 20. However, in operation, the bearing cup 20 has a tendency to move relative to the trunnion 30, and with time, the innermost edge of the bumpers next to the one end 24 wears away and the end 24 of the bearing cup 20 can move unrestrained relative to the bumpers 42 and the trunnion 30. The bearing cup 20, which is generally cylindrical, fits over a trunnion 30 of the four lobed spider 7. The bearing cup 20 is spaced radially away from the surface 32 of the trunnion 30 by the bearings 5 to form a cavity 22.

The one end 24 of the bearing cup 20 slides over the trunnion 30 of the four lobed spider 7 and the opposite end 26 is closed so that the cup 20 encapsulates a plurality of roller bearings 5 between the trunnion 30 and the inner surface 28 of the bearing cup 20. The roller bearings 5 are oriented axially within the cavity 22 to permit the roller bearings to rotate and allow the bearing cup 20 to move relative to the trunnion 30. A flat resinous washer 6 is preferably made of ACETEL® thermoplastic which is a registered trademark of Du Pont, but any other suitable material would be acceptable. The washer is inserted into the cavity 22 through the open end 24 of the bearing cup 20 and placed on the ends of the plurality of roller bearings 5. The washer 6 limits the axial movement of the roller bearing 5 within cavity 22. The cavity 22 contains the roller bearings 5, the washer 6, and lubricant therein. The lubricant may be lubricating oil or grease or any other suitable material which is well known in the art.

The outer surface 21 of the bearing cup 20 is adjacent the outer diameter portion 60 of the seal 100. The outer diameter portion 60 is supported by a second generally cylindrical case 56 which has two axially extending portions with one portion 58 bent over at approximately 1800 to the other portion 57. The one portion 57 is longer than the other portion 58. Preferably, both portions 57, 58 respectively, are over molded with the elastomer material which forms the rubber body 18. The rubber surface on the one portion 57 forms a static seal 59 against the outer surface 21 of the bearing cup 20. The inner diameter of one portion 57 is sized to form an interference fit between the outer surface 21 and the rubber surface 59 on portion 57. Optionally, the inner surface of the one portion 57 which is opposite the outer surface 21 is not overmolded with rubber so that surface 59 forms a metal to metal interference fit against the surface 21.

A rubber coated end 62 on the other portion 58 of the outer diameter portion 60 is located adjacent to a shoulder 23 on the bearing cup 20 and may be used to axially position the outer diameter portion 60 to the bearing cup 20. The rubber coated end 62 may be optionally be molded with a chamfer or radius to ease the assembly of the seal 100 onto the bearing cup 20.

Figure 3:
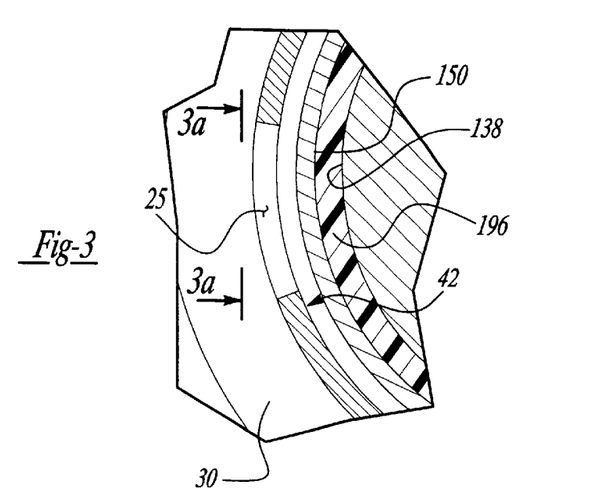
FIG. 3 is a partial sectional view along 3—3 of FIG. 2.
Figure 3A:
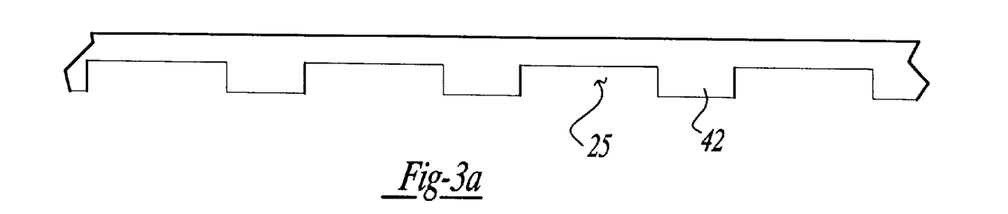
Figure 3B:
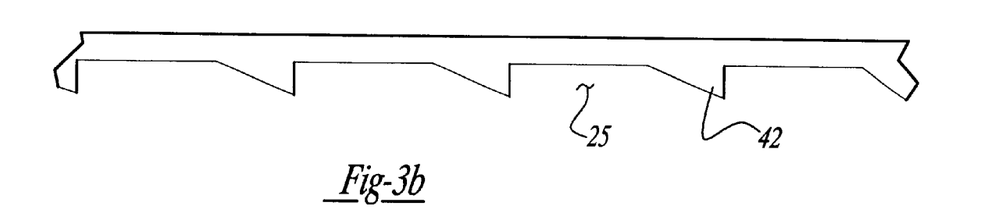
Figure 3C:
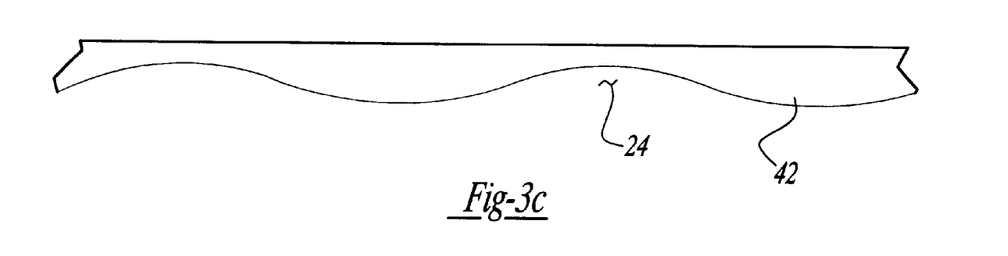
Figure 3D:
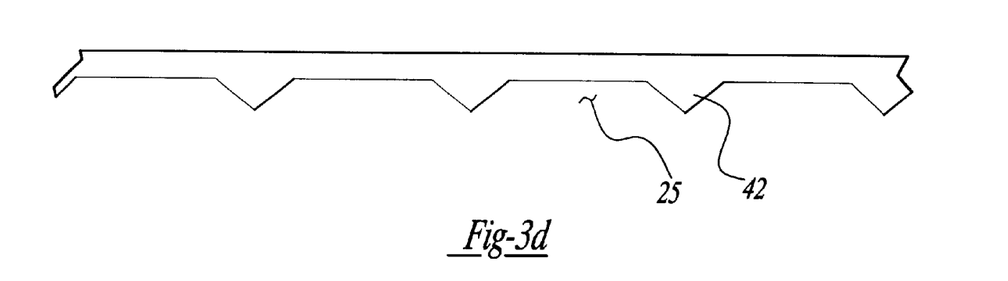

The web portion 80 extends from the radial extending portion 54 of the first case 50 to the other portion 57 of the second case 56 and forms an enclosure 81. The passages 25 adjacent to the rubber bumper 42 permit flow communication between the enclosure 81 and the cavity 22 as shown in FIG. 3. As stated earlier, preferably the passages are generally rectangular as shown in FIG. 3a. Alternatively the passages 25 may be sawtoothed, sinusoidal or triangular as shown in FIGS. 3b, 3c, and 3d.

The web portion 80 includes at least one convoluted portion 82 which permits limited relative angular movement of the inner diameter portion 40 to the outer diameter portion 60 of the seal 100. The elastomeric web portion 80 also may flex to facilitate the inner diameter portion 40 and the trunnion 30 to rotate relative to the outer diameter portion 60 and the bearing cup 20. The web portion 80 can be designed to stretch and twist or compress and twist as the conditions of the specific application require by utilizing additional convolutes 82 and/or optionally, ribs 84 in the web portion 80.

The ribs of the web portion 80 may be optionally circumferentially oriented or axially oriented or helically oriented to support the convoluted portion 82. The ribs may be optionally recessed or raised. The number of convoluted portions or bends 82 and rib configurations as well as the thickness of the web, height of the convolutes above surface 24 will depend on the specific geometrical constraints of the universal joint and the relative movement desired between the trunnion 30 and the bearing cup 20.

As stated earlier, the elastomeric inner diameter portion 40 has a static seal 38 which is in sealing cooperation with the inner surface 32 of the trunnion 30 and the outer diameter portion 60 has a static seal 59 which is in sealing cooperation with the surface 21 of the bearing cup 20. Optionally, to enhance sealability, the static seals 38, 59, respectively, each may have at least one sealing bead which produces a high line sealing force against the mating surfaces 32, 21, respectively.

During assembly, if the sealing beads of the static seals 38, 59, respectively, engage the mating surfaces 32, 21, respectively, air will be trapped within the bearing cavity 22. As a result, pressure will build in the cavity 22 as the volume which forms the cavity 22 becomes reduced as a result of the axial movement of the bearing cup onto the trunnion to attain the final assembled condition as shown in FIG. 2. In the preferred embodiment, venting of pressure out of cavity 22 is facilitated through the trunnion which is fitted with a grease fitting communicating to each bearing cavity through a passage 35 and a connecting vent hole 34 drilled in the trunnion, as is well known in the prior art.

Some applications cannot accommodate a vent hole in the trunnion. In lubricated for life Universal Joint assemblies, it has been found to be advantageous to provide a venting function in the seal. In the following alternate embodiments, various other configurations of the seal will be described and all will include a venting function through or past the seal. The vent relieves any moderate pressure level in the cavity 22 which is formed either during the axial assembly process or during operation of the universal joint as described previously. As stated earlier, if the pressure in the cavity is not vented, the pressure in the cavity 22 can build up to an excess level which can force the seal to move axially off the bearing cup. Once a seal is forced off the bearing cup, the universal joint can lose lubrication fluid and run dry. Eventually, if not discovered by the operator in time, this could lead to bearing failure or permit contaminants such as mud or dirt to enter into the cavity 22 where the contaminants can contribute to bearing failure. Thus, the ability to provide a vent in a Universal Joint seal to purge moderate pressure out of the cavity 22 is advantageous and desired in the industry.

Figure 4:
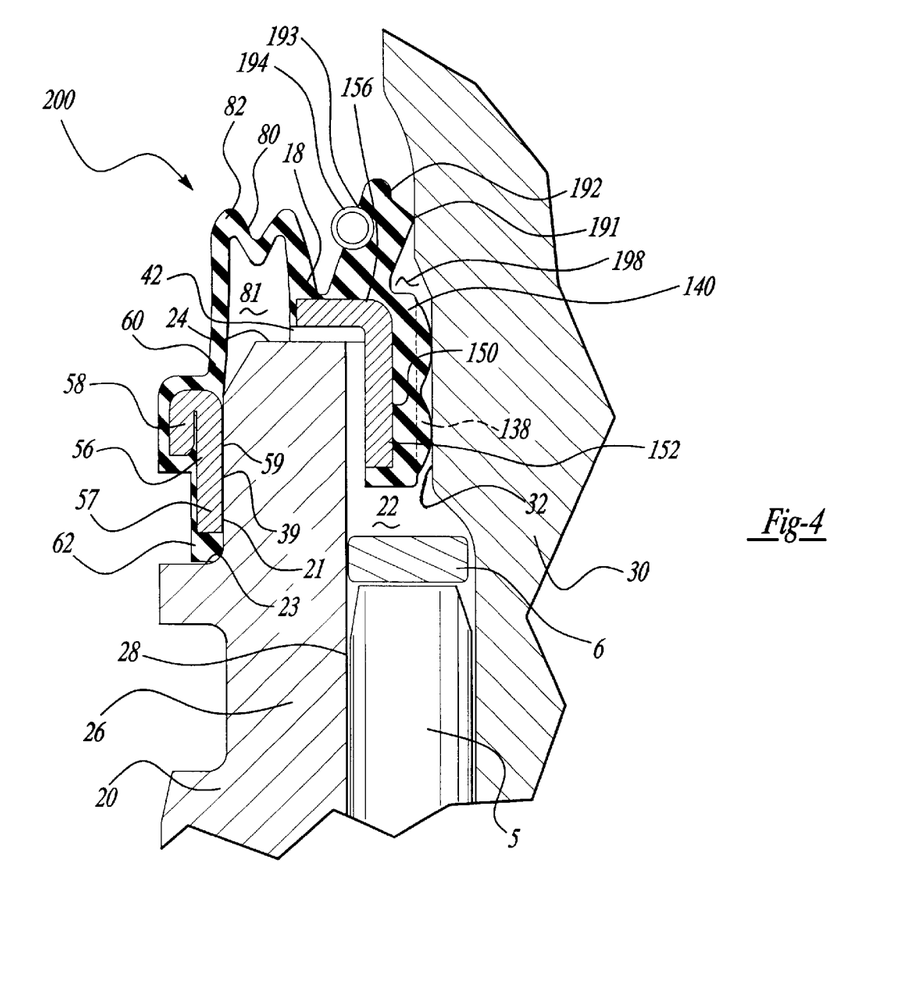
FIG. 4 is a partial cross-sectional view of the first alternate embodiment of the seal for a universal joint according to the invention.

The first alternate embodiment of the seal is designated by the numeral 200 shown in FIG. 4. Many of the elements previously described in the preferred embodiment are identical and where they are the same, they are designated by numerals previously used to describe seal 100.

The seal 200 includes a web portion 18, an outer portion 60 and an inner portion 140. The web portion 18, outer diameter portion 60 and the inner diameter portion 140 are formed of an elastomeric material. The outer diameter portion 60 is adjacent to the bearing cup 20 and the inner portion 140 is adjacent to the trunnion 30. A radial lip 192 is formed in the inner diameter portion 140. The lip seal 192 normally contacts the surface 32 of the trunnion 30 and is located adjacent to the static seal 138 of the inner portion 140. To ensure that the end 191 of lip 192 contacts the surface 32, it is desirable to form an annular cavity 193 in the end 191 of the lip 192. A garter spring 194, which is well known in the art, is inserted into an annular cavity 193 formed in the lip 192. The spring 194 assures that the lip 191 contacts the surface 132 on the trunnion 30 even if the elastomeric material forming lip 191 relaxes with time, that is, loses some of its biasing force to keep the lip 191 in contact with surface 132.

The static seal 138 includes at least one axial groove 196. The groove 196 forms a passageway between the cavity 22 and an annulus 198. The annulus 198 is formed in the space between the static seal 138 and the radial vent lip 192. The first case 150 supports the inner diameter portion 140 and includes an axial extending portion 152, and a radial portion 156. The radial portion 156 provides support and stiffening for the static seal 138 against surface 32. The end 191 of the lip seal 192 is normally in contact with the surface 32 of the trunnion 30 so as to form a barrier to prevent any dirt or contaminants from outside the sealed region to migrate past the lip seal 192 then into the annulus 198 and then through the groove 196 into the cavity 22, and also to prevent lubrication from moving out of cavity 22 into annulus 198 and outside the sealed region.

The tip or end 191 of the lip seal 192 is biased by its cantilevered design, the garter spring 194, and the elastomeric properties of the rubber to normally remain in contact with the surface 32 of the trunnion 30. As pressure builds up to a moderate level in the cavity 22, the tip 191 lifts away from the surface 32 to vent the moderate pressure out of the cavity 22. As soon as the moderate pressure is vented, the tip 191 moves to contact the surface 32. In all other aspects, the structure and performance of seal 200 is the same as seal 100.

Figure 5:
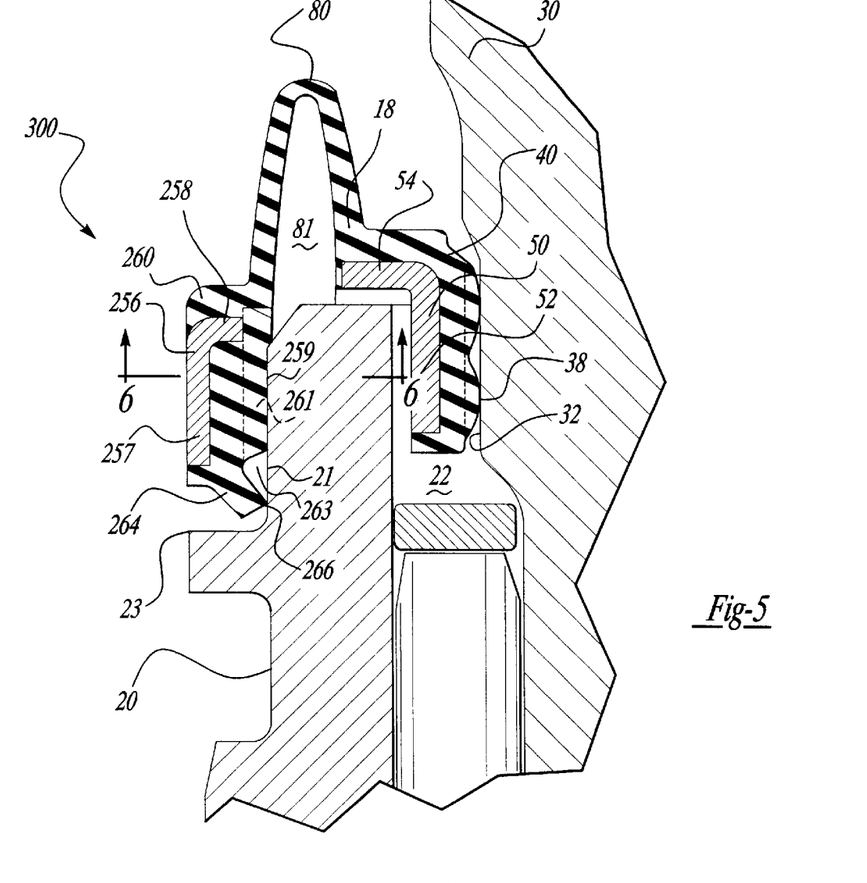
FIG. 5 is a partial cross-sectional view of the second alternate embodiment of the seal for a universal joint.
Figure 6:
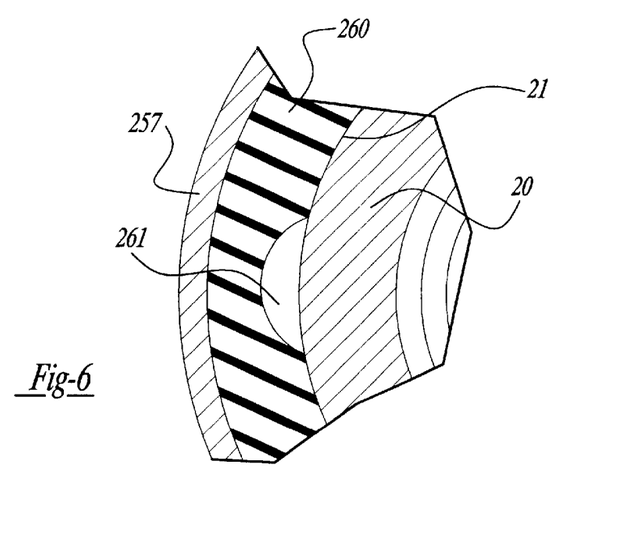
FIG. 6 is a partial sectional view along 6—6 of FIG. 5.

The second embodiment of the seal is designated by the numeral 300 as shown in FIGS. 5 and 6. Many of the elements previously described in the preferred embodiment are identical and where they are the same they will be designated by the numerals previously used to describe the seal 100.

The seal 300 includes a web portion 80, an inner diameter portion 40 and an outer diameter portion 260 which are all formed of an elastomeric material. The inner diameter portion 40 is adjacent to the trunnion 30 and the outer diameter portion 260 is adjacent to the bearing cup 20. A radial lip seal 264 is formed in the outer diameter portion 260. The second diametral case 256 has an axially extending portion 257 and a radially extending portion 258. The inner surface of the axially extending portion is coated with rubber which forms a static seal 259 with the surface 21 of the bearing cup 20. The second case 256 provides support and stiffening for the static seal 259 against the surface 21 of the bearing cup 20. At least one axial groove 261 is formed in the static seal 259 adjacent to the surface 21 of the bearing cup 20. The groove 261 is in flow communication with the enclosure 81 which is in flow communication through the passage 25 with the cavity 22. Adjacent to the static seal 259 and the groove 261 is formed an annulus 263 which is in flow communication with the groove 261. Adjacent to the annulus 263 is the lip seal 264. The tip 266 of the seal 264, normally contacts the surface 21 of the bearing cup 20 and is spaced away from the shoulder 23. This permits the tip 266 to flex and lift off the surface 21 in response to a moderate pressure build up in the cavity 22 so as to vent moderate pressure out of cavity 22 into the atmosphere. In all other aspects, the structure and performance of seal 300 is the same as seal 100.

Figures 7, 8:
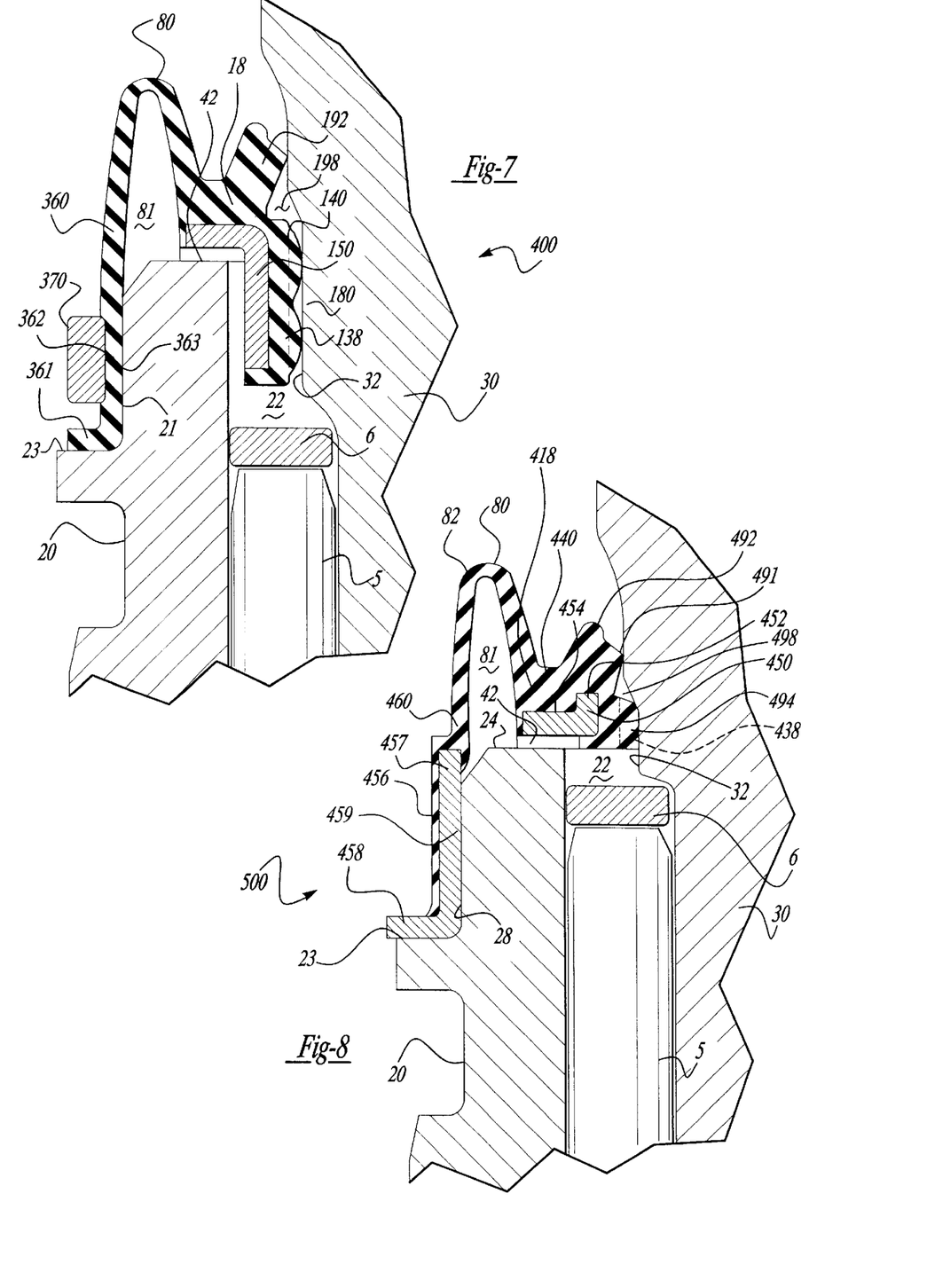
FIG. 7 is a partial cross sectional view of the third alternate embodiment of the seal for a universal joint.
FIG. 8 is a partial cross-sectional view of the fourth alternate embodiment of the seal passage.

The third alternate embodiment of the seal is designated by the numeral 400 as shown in FIG. 7. Many of the elements previously used to describe the first alternate embodiment are identical and where they are the same, they are designated by the numerals previously used to describe seal 200.

The seal 400 includes a web portion 80, an inner diameter portion 140 and an outer diameter portion 360 which are made of an elastomeric material. A lip seal 192 is formed in the inner diameter portion 140 and the lip 192 normally contacts the surface 132 on the trunnion 30. The inner portion 140 is overmolded and has a static seal 138 on the inner portion 140 which contacts surface 32. The seal 400 has only the first case 50 which supports the static seal 138 against surface 132 of the trunnion 30. The elastomeric outer diameter portion 360 extends axially along surface 21 and ends with a radially extending section 361 which abuts the shoulder 23 of the bearing cup 20. To secure the outer diameter portion 360 to the bearing cup 20, a round cylindrical spring clamp 370 is utilized. Optionally, a hose clamp or other fastening devices well known in the art may be used. The round clamp 370 is conventional and it compresses the inner diameter portion 363 against the surface 21 to form a static seal 362 and to prevent the migration of fluid along the surface 21. The lip 192 flexes to lift off surface 132 in response to a moderate pressure build up in cavity 22 to vent moderate pressure out of cavity 22 and into the atmosphere. In all other aspects, the seal 400 is the same as seal 200.

The fourth alternate embodiment of the seal is designated by the numeral 500 as shown in FIG. 8. Many of the elements previously described in the preferred embodiment are identical and where they are the same, they are designated by numerals previously used to describe seal 100. The seal 500 includes a rubber body 418 which is made of elastomeric material. The rubber body 418 includes an inner diameter portion 440, an outer diameter portion 460, a flexible web 80, a first case 450, and a second case 456. The first case 450 has a radially extending section 454 and an axially extending section 452. The second case 456 has an axially extending portion 457 and a radially extending portion 458. The first case 450 stiffens or supports the static seal 438 of the rubber body 418 which abuts the surface 32 on the trunnion 30. The second case 456 forms an interference fit with the surface 28 of the bearing cup 20.

A passage 494 is formed in the static seal 438 to permit flow communication from cavity 22. A radial lip seal 492 is formed in the inner diameter portion 440. The tip 491 of lip seal 492 normally contacts surface 32 of the trunnion 30 and is located adjacent to the static seal 438 of the inner portion 440. At least one axial slot or passage 494 is formed within static seal 438 to form a flow communication channel between the cavity 22 and an annulus 498. Annulus 498 is formed in the space between the static seal 438 and the end 491 of the radial vent lip 492 adjacent to the surface 32 of the trunnion 30. The end 491 of the lip seal 492 is normally in contact with the surface 32 of the trunnion 30 so as to form a barrier to prevent the migration of dirt into the sealed region. The lip 491 is normally biased to remain in contact with the surface 32. As the pressure builds up in the cavity 22 to a moderate level, the lip 491 lifts off the surface 32 to vent any moderate pressure out of the cavity 22 through the axial slot 494 then into annulus 498 and out of the sealed region into the ambient atmosphere. As soon as the moderate pressure is vented and the pressure across the lip 491 generally equalizes, the lip 491 again returns to contact surface 32.

The second case 456 is generally cylindrical and has an axial portion 457 which is coated with a thin layer of rubber and forms a static seal 459 which abuts against surface 28 of the bearing cup 20. A radial portion 458 abuts against shoulder 23. The static seal 459 abuts against surface 28 and the shoulder 23 of the cup 20. The rubber bumpers 42 are adjacent to the end 24 of the bearing cup 20 in order to position the static gasket 438 against the surface 32. The enclosure 81 is in flow communication with the cavity 22 through the passages 25 in the bumpers 42. In all other aspects, the seal 500 functions the same as seal 100.

Figure 9:
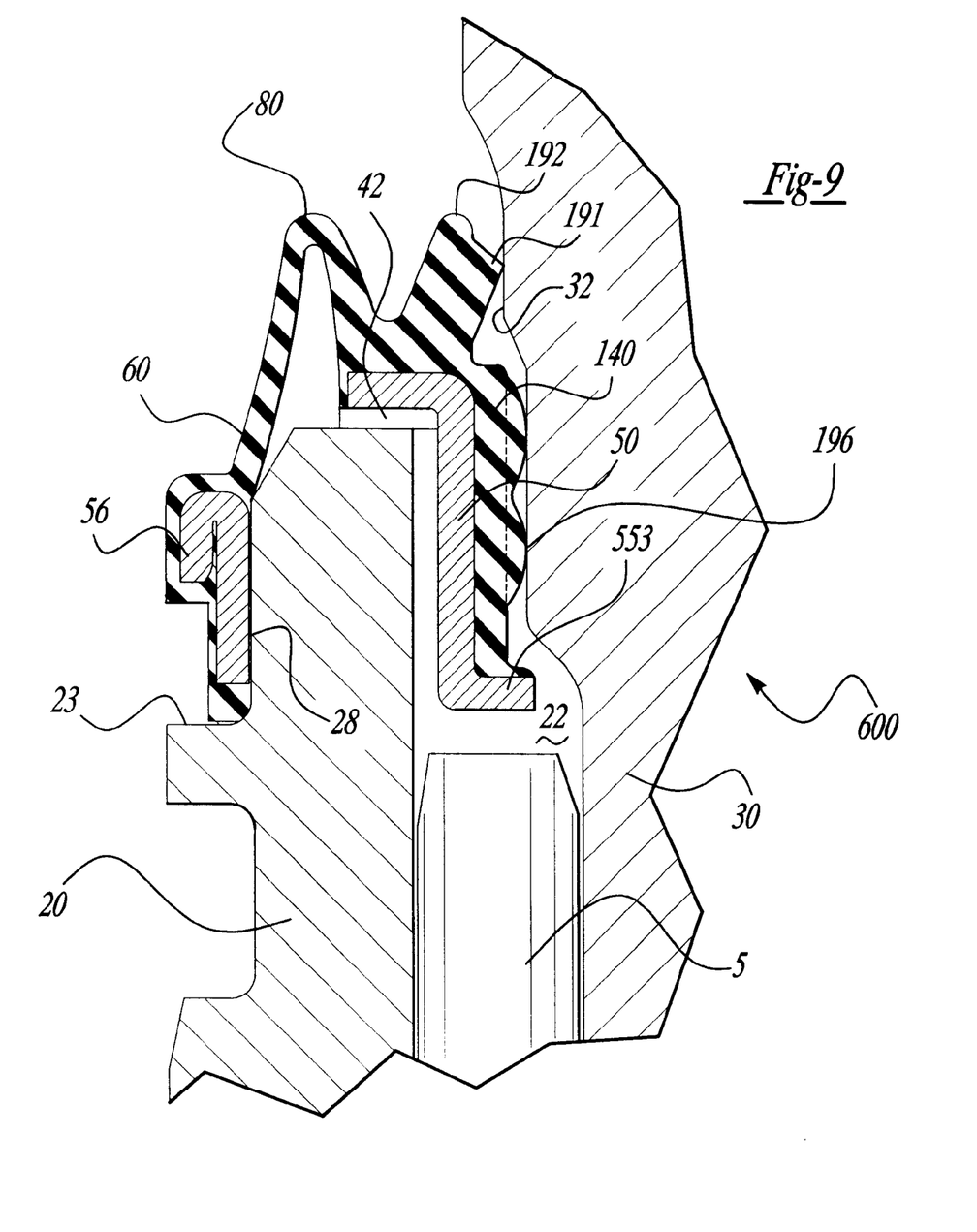
FIG. 9 is a partial cross-sectional view of the fifth alternate embodiment of the seal.

The fifth embodiment of the seal is designated by the numeral 600 as shown in FIG. 9. Many of the elements previously described in the first alternative embodiment are identical and where they are the same, they are designated by the numerals previously used to describe seal 200. The seal 600 includes the web portion 80, the outer diameter 60 and the inner diameter portion 140 which are made of an elastomeric material. The outer diameter portion 60 is adjacent to the bearing cup 20 and the inner diameter portion 140 is adjacent to the trunnion 30. The seal 600 eliminates the need for the washer 6 by adding an additional radial extension 553 to the first case 550. The radial extension 553 protrudes radially into the cavity 22 to act as a stand-off so as to limit the axial movement of the roller bearings 5 in the cavity 22. The first case 550 also has a second axial extension 554 which is between the washer 42 and the web portion 80. In all other aspects, the seal 600 functions the same as seal 200.

Figure 10:
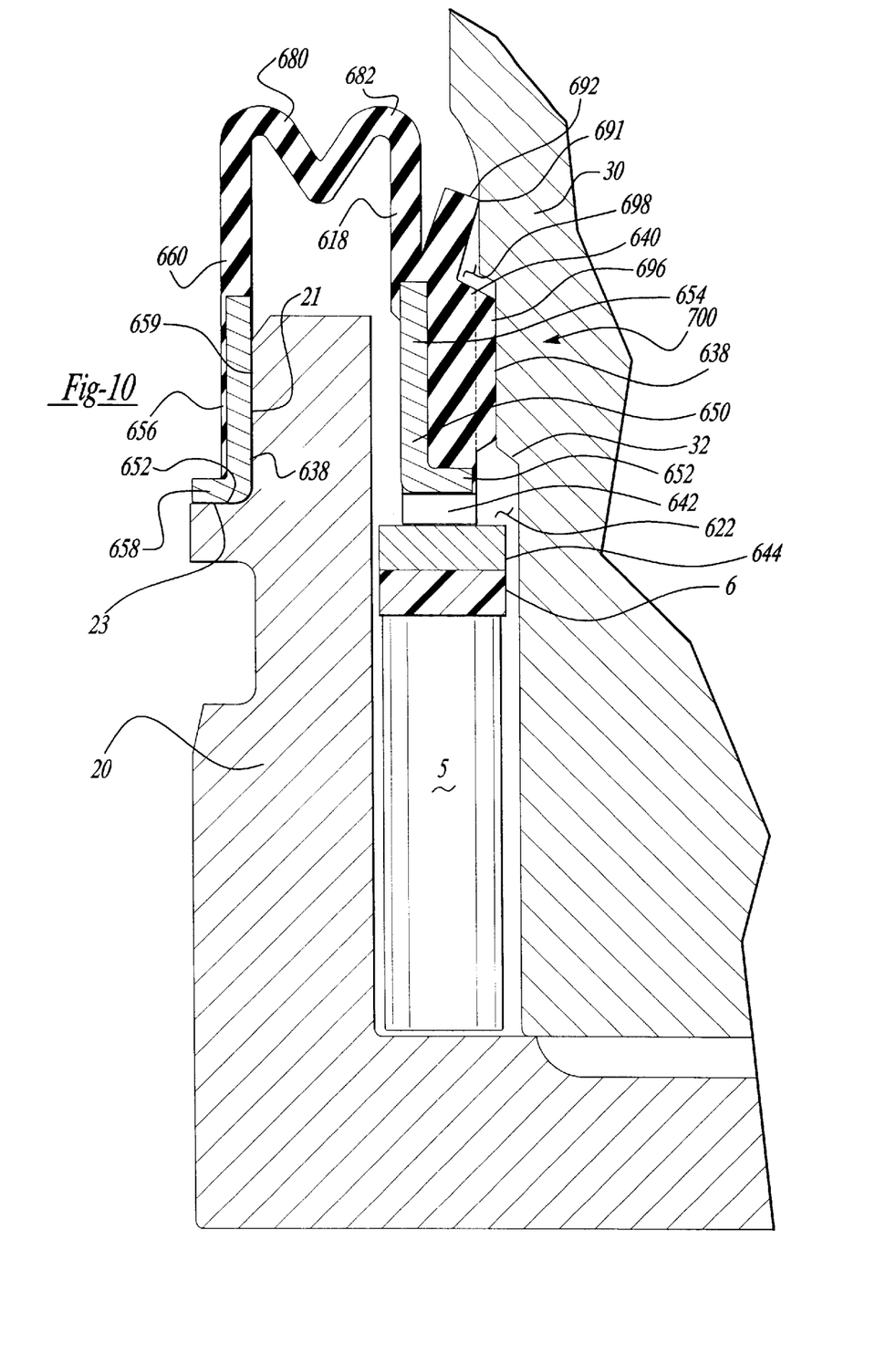
FIG. 10 is a partial cross-sectional view of the sixth alternative embodiment of the seal.

The sixth alternative embodiment is designated by the numeral 700 as shown in FIG. 10. Many of the elements previously described in the preferred embodiment are identical and where they are the same, they are designated by numerals previously used to describe seal 100. The seal 700 includes a rubber body 618. The body 618 includes an inner diameter portion 640, an outer diameter portion 660, and a flexible web portion 680 which are made of an elastomeric material. The inner diameter portion 640 is supported by a generally L-shaped case 650 which has an axially extending section 654.

The elastomeric inner diameter portion 640 is adjacent to the trunnion 30 and is overmolded with the elastomer material of the rubber body 618. The portion 640 also has a rubber surface which forms a static seal 638 against the surface 32 of the trunnion 30. A plurality of cushion portions 642 is integrally formed of elastomer to project axially from the radially extending section 652. The cushion portion 642 preferably does not form a continuous annular surface against an adjacent donut shaped washer or ring 644. The surfaces of the cushions 642 are discontinuous and preferably have annular openings 645 which are equally spaced around the circumference of the cushion 642. Preferably, the annular openings 645 are rectangular. Alternatively, they may be quadrilateral or triangular, or sawtoothed, or sinusoidal. The washer 644 is preferably made of a low friction resinous fluorocarbon lubricious thermoplastic material such as Teflon® a Registered Trademark of Du Pont. Alternatively, the low friction may be made of Hostaflon® material which is a Registered Trademark of Dyneon. The washer 644 is adjacent to the flat round resinous washer 6 which rests on the ends of the plurality of roller bearings 5. The cushion 642, the washer 644, flat washer 6, and plurality of roller bearings 5 all fit within the cavity 622 which is formed between the trunnion 30 and the bearing cup 20. The bearing cup 20, which is generally cylindrical, fits over one of the turnings or lobes 7 of the trunnion 30. The bearing cup 20 is spaced radially away from the surface 32 of the trunnion 30 by the bearings 5 to form a cavity 622. During assembly, the cushion 642 of the inner diameter portion 640 is supported by the bottom of the bearing cup through the rollers 5, washer 6, and a low friction washer 644. The cushion 642 supports the inner diameter portion 640 as the trunnion 30 is pushed through the seal 700 as the bearing cup assembly is installed onto the trunnion 30. The inner diameter portion 640 of the rubber body 618 forms a static seal 638 with the surface 32 of the trunnion 30. The cup assembly including the bearing cup, rollers, washer, low friction washer and seal (which has been pre-assembled into the cup after inserting the rollers and the washers) are installed onto the trunnion 30. During operation, the cushion portions 642 permit the inner diameter portion 640 of the seal 600 to slide along the surface of the low friction ring 644. Over time the cushion portions 642 wear away and may no longer contact the washer 644. Optionally, the flat washer 6 and/or the low friction washer 644 may be eliminated. By supporting the portion 642 on the rollers and washers, the seal utilizes radial space more efficiently thereby permitting room for additional convolutions in the web if desired.

The outer surface 21 of the bearing cup is adjacent the outer diameter portion 660 of the seal 600. The outer diameter portion 660 is also supported by a second generally cylindrical case 656. The case 656 has an axially extending portion 658. Both the case 656 and one portion 658 are over molded with an elastomer material of the rubber body 618. As a result, the radially extending portion of the case 656 has a rubber surface which forms a static seal 649 against the outer surface 21 of the bearing cup 20. A rubber coated end 652 on the portion 658 is adjacent to the shoulder 23 on the bearing cup 20 and forms a static seal with the cup 20. Alternatively, the surface contacting the bearing cup may be a bare metal insert without rubber overmolding.

The web portion 680 extends from the radially extending portion 654 of the first case 650 to the radially extending portion of the second case 656. The web portion 680 includes at least one convoluted portion 682 but preferably two convoluted portions. The convoluted portion 682 permits limited relative angular movement of the inner diameter portion 640 to the outer diameter portion 660 of the seal 600. The elastomeric convoluted portion 682 flexes to permit the inner diameter portion 640 and the trunnion 30 to move relative to the outer diameter portion 660 and the bearing cup 20. The web portion 680 is designed to stretch and twist or compress and twist as the conditions of the specific application require. Optionally, additional convolutes, and/or optionally ribs 684 may be employed to form the web portion 680.

The convoluted portion 682 may optionally include ribs which are circumferentially oriented or axially oriented or helically oriented to support the convoluted portion 682. The ribs may be optionally recessed or raised. The number of convoluted portions or bends 682 and rib configurations as well as the thickness of the web, height of the convolutes above the surface 24 of the bearing cup 20 will depend on the specific geometrical constraints of the universal joint and the relative movement desired between the trunnion 30 and the bearing cup 20.

Optionally, to enhance the sealability of the static seals 638, 639 respectively against mating surfaces 32, 21, respectively, each may have at least one sealing bead molded onto the seals 638, 639, respectively, to produce a high line sealing force against the surfaces 32, 21, respectively. The seal 600 includes a radial vent lip 692 in the inner diameter portion 640. The lip seal 692 normally contacts the surface 32 of the trunnion 30 and is located adjacent to the static seal 638 of the inner portion 640. Additionally, there is at least one axially extending groove 696 in the static seal 638. The at least one groove 696 forms a passageway between the cavity 622 and an annulus 698. The annulus 698 is formed in the space between the static seal 638 and the radial vent lip 692. The end 692 is normally in sealing contact with the surface 32 of the trunnion so as to form a barrier to prevent any dirt or contaminants from outside the sealed region to migrate past the lip seal 692 then into the annulus 698 and then through the groove 696 with the cavity 622.

The tip or end 691 of the lip seal 692 is biased by its cantilevered design and elastomeric properties of the rubber to remain in contact with the surface 32 of the trunnion 30. As pressure builds up to a moderate level in the cavity 622, the tip 691 lifts away from the surface 32 to vent moderate pressure out of the cavity 622. As soon as the moderate pressure is vented, the tip 691 moves to once again contact the surface 32 as the pressure in the cavity 622 returns to normal pressure.

Figure 11:
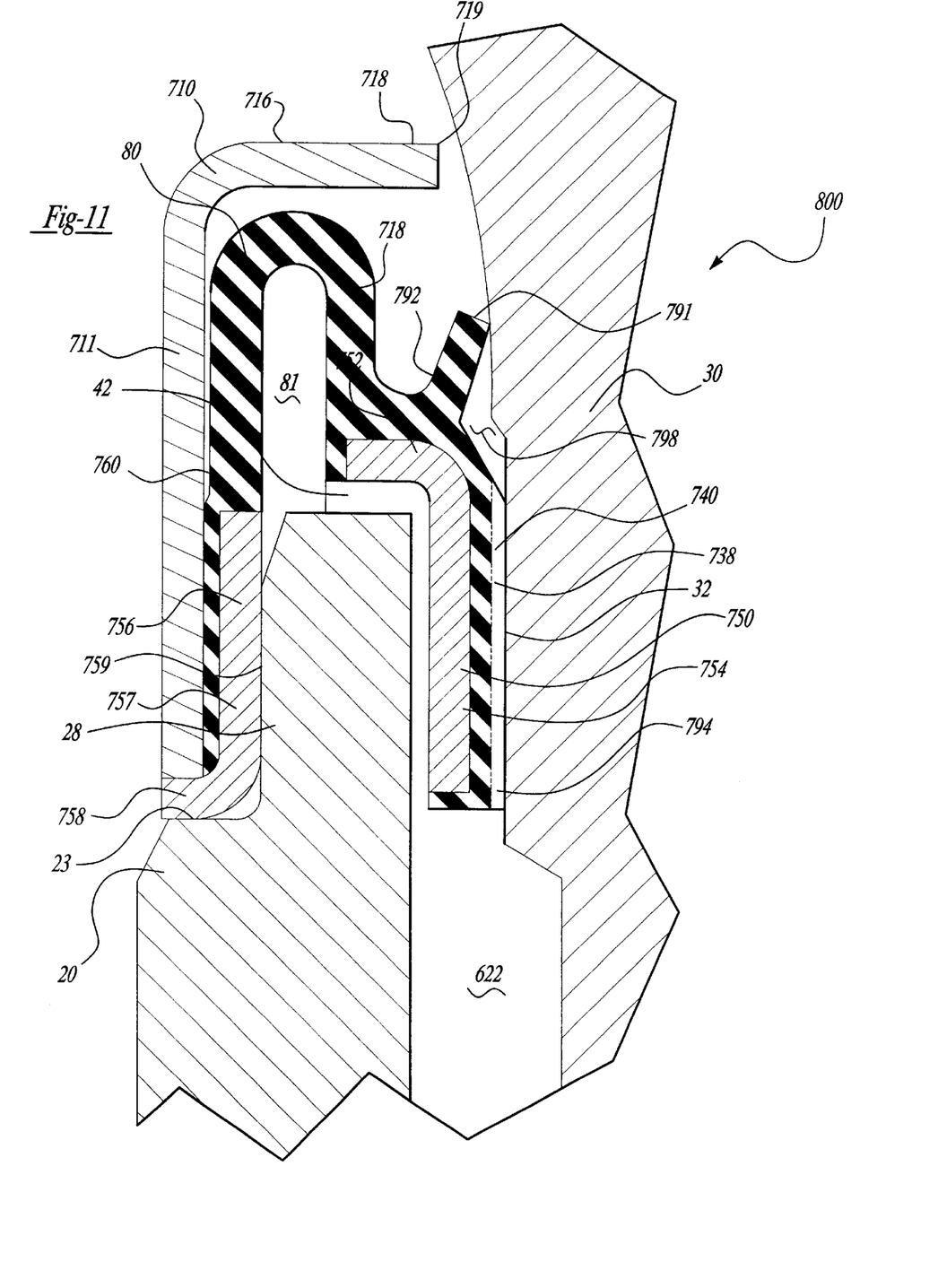
FIG. 11 is a partial cross-sectional view of the seventh alternative embodiment of the seal.

The seventh alternative embodiment is designated by the numeral 800 as shown in FIG. 11. Many of the elements that were previously described are utilized, and where they are the same, they are designated by numerals previously used to describe the seal 100.

The seal 800 contains a rubber body 718 which includes an inner diameter portion 740 and outer diameter portion 760 and a flexible web portion 80 and is made of an elastomeric material. The inner diameter portion 740 is adjacent to the trunnion 30 and is supported by a generally L-shaped case 750. The case 750 has an axially extending section 754 and a radially extending section 752. The case 750 is overmolded with rubber or elastomeric material such that both section 752 and 754 are completely encapsulated by rubber. The inner diameter portion 740 forms a static seal 738 against the surface 32 of the trunnion 30. A passage 794 is formed in static seal 738 to permit flow communication with the cavity 622. The inner diameter portion 740 has a radial lip seal 792 which is in contact with surface 32 of the trunnion 30 and is located adjacent to the static seal 738. An annulus 798 is formed in the space between the static seal 738 and the seal 791 of the radial vent seal 792. The end 791 of the lip seal 792 is normally in contact with the surface 32 of the trunnion 30 so as to form a barrier to prevent the migration of dirt into the sealed region. The lip 791 is normally biased to remain in contact with the surface 32. As the pressure builds up in the cavity to a moderate level, the lip 791 lifts off the surface 32 to vent any moderate pressure out of the cavity 22 through the axial slot 794, then into annulus 798, past the lip 791, and out of the sealed region into the ambient atmosphere. As soon as the moderate pressure in the cavity 22 and annulus 798 is vented and the pressure across the lip 791 generally equalizes, the lip 791 again returns to contact surface 32.

The inner diameter portion 740 also has a plurality of equally spaced rubber or elastomeric bumpers 42 with passages 25 to permit flow communication with cavity 22 and the enclosure 81. The rubber bumpers 42 are adjacent to the end 24 of the bearing cup 20 in order to position the static gasket 738 against the surface 32 of the trunnion 30. The flexible web portion 80 connects the inner diameter portion 740 to the outer diameter portion 760.

The outer diameter portion 760 has a second case 756 to reinforce it. The second case 756 is generally cylindrical and has an axial portion 757 which is coated with rubber and forms a static seal 759 which abuts against surface 28 of the bearing cup 20. A radial portion 758 abuts against shoulder 23. The static seal 759 abuts against surface 28 and the shoulder 23 of the cup 20.

Optionally, a stone shield 710 is provided to function as a safety guard to prevent stone impingement on the seal 800. The shield 710 has an axial section 711 and a radial section 716. The axial section 711 has an end 712 which abuts against the radial portion 758. The radial section 716 extends over the web portion 80 and has an end 718 which terminates in a spaced relationship with surface 32 of the trunnion to form a gap 719. The stone shield 710 not only protects seal 800 from stone damage or other road debris and the like but also aids to ease assembly of the outer diameter portion 760 onto the bearing. The shield 710 also acts as an assembly aid by providing a larger bearing surface at the radial portion 716 to press against during insertion of the end 758 of the seal 800 onto the shoulder 23 of the bearing cup 20. The stone shield 710 is made of a rigid material such as steel, plastic, aluminum, magnesium or like material. In all other aspects, the performance of seal 800 is the same as seal 200.

Figure 12:
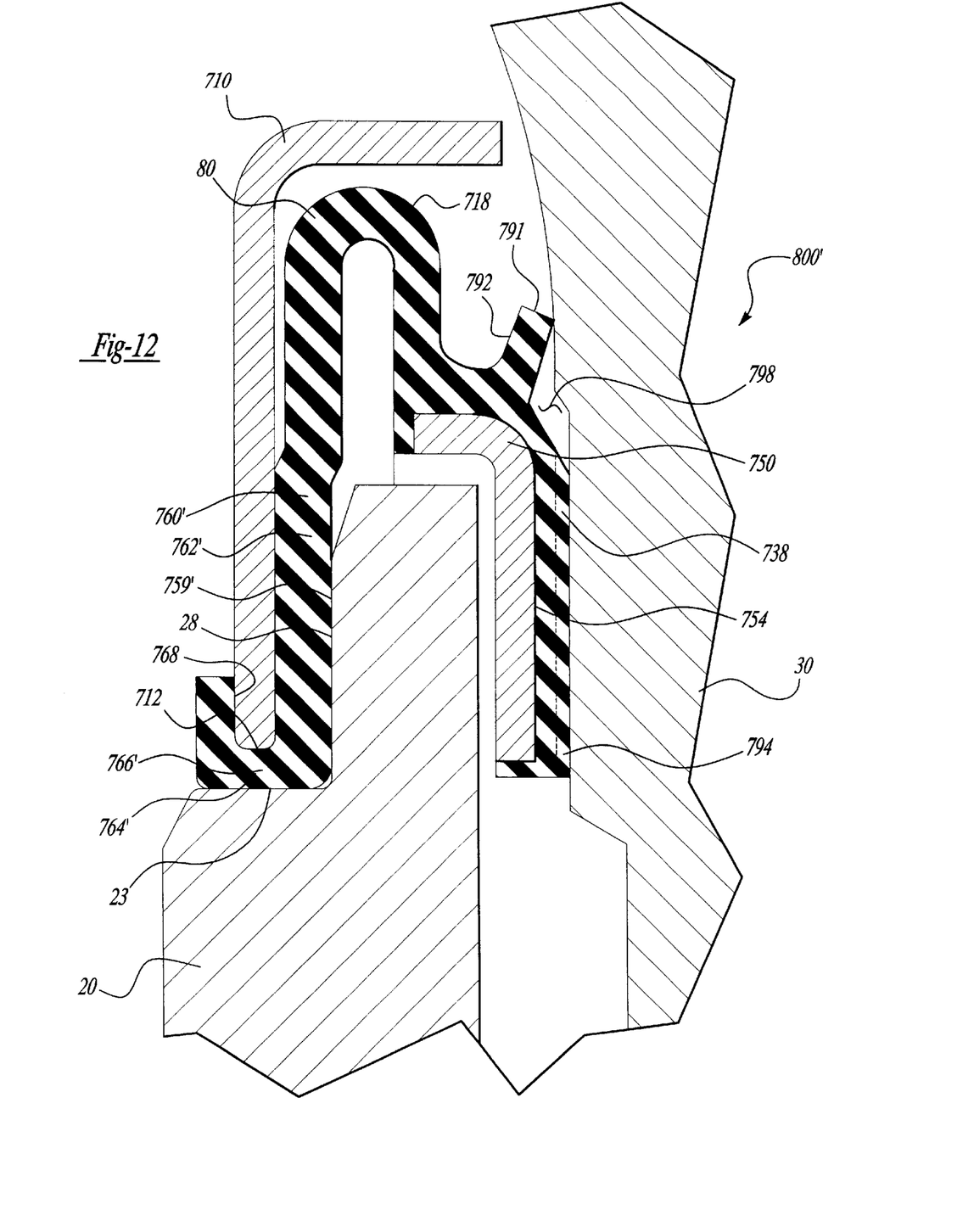
FIG. 12 is a partial cross-sectional view of the seventh alternative embodiment of the seal with an optional elastomeric outer portion.

Optionally, the stone shield 710 also functions as a fastener in the optional embodiment of seal 800', as shown in FIG. 12. The seal 800' has an outer diameter portion 760' which is not supported by a second case. The outer diameter portion 760' is formed entirely of an elastomeric or polymer material and has both an axially extending portion 762' and a radially extending portion 764'. The axially extending portion is adjacent to the web portion 80. The radially extending portion 764' has a U-shaped end 766' which abuts against surface 28 and the shoulder 23 of the bearing cup 20. The end 712 of the shield 710 is inserted into the cavity 768' in this U-shaped end 766' to compress the axially extending portion 762' radially against surface 28. The end 712 also holds the radially extending portion 764' against the shoulder 23 of the bearing cup 20. Thus, the shield 710 functions to protect the seal 800, acts as an assembly aid and facilitates fastening the outer diameter portion 760 to the bearing cup 20. In all other aspects the performance is the same as seal 800.

Figure 13:
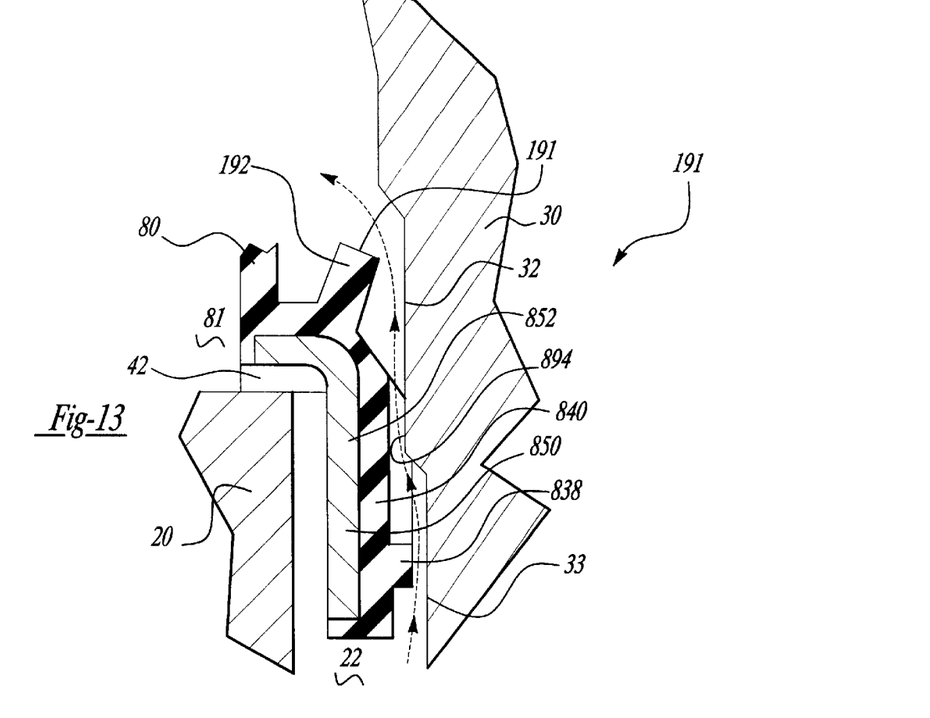
FIG. 13 is a partial cross-sectional view of the eighth alternative embodiment prior to assembly to the bearing cup and trunnions.

The eighth alternative embodiment is designated by the numeral 900 as shown in FIG. 13. Many of the elements that were previously described are identical and where they are the same, they are designated by numerals previously used to designate the seal 200.

The seal 900 is formed with an inner diameter portion 840, an outer diameter portion 60 (not shown) and a flexible web portion 80 which are made of an elastomeric material. The outer diameter portion 60 is adjacent to the bearing cup 20. The inner diameter portion 840 is adjacent to the trunnion 30 and is supported by a generally L-shaped case 850. The portion 840 also has bumpers 42 with passages 25 to permit flow communication between the enclosure 81 and the cavity 22.

The inner diameter portion 840 has a static seal 838 which is located near the end of the axially extending section 852 of the first case 850 which stiffens or supports the static seal 838. The trunnion 30 has an angled chamfer which is disposed between a surface 33 and a surface 32 of the trunnion. Surface 32 has a smaller diameter than surface 33.

The inner diameter portion 840 has a radial seal 192, an end 191 and a passageway 894 which is formed between the static seal 838 and the end 191 along the surface 33. The length of the passageway 894 will vary from one application to the next as it will become apparent from the operation of the seal 900.

Figure 14:
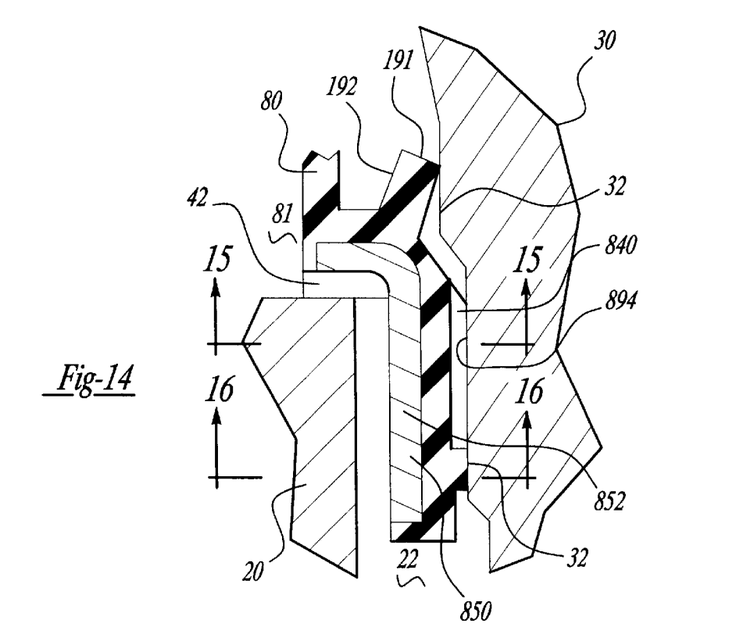
FIG. 14 is a partial cross-sectional view of the eighth alternative embodiment as assembled.
Figures 15, 16:
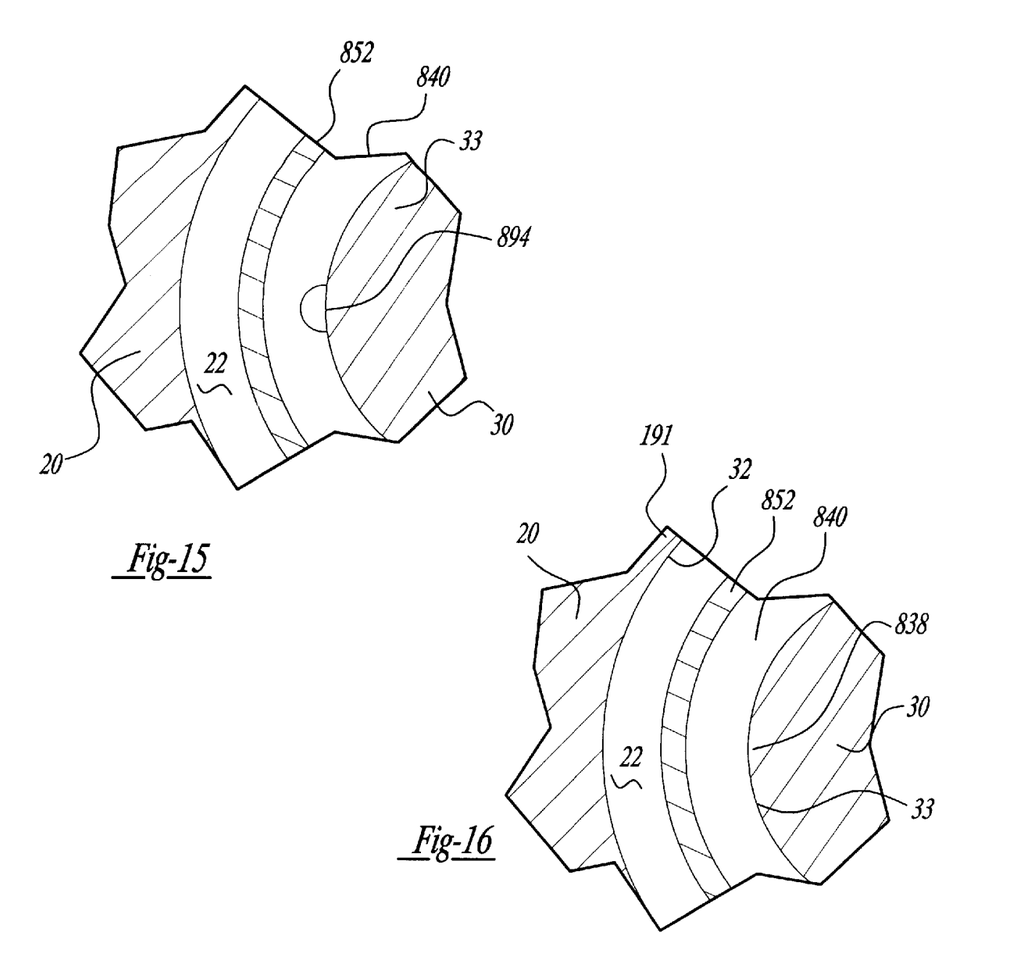
FIG. 15 is a sectional view along 15—15 of FIG. 14.
FIG. 16 is a sectional view along 16—16 of FIG. 14.

As seal 900 is being assembled to the trunnion 30 and bearing cup 20, the bumpers 42 are positioned on top of the bearing cup. The static seal 838 is adjacent to surface 33 and below the chamfer. As the trunnion 30 is axially pressed downward, as shown in FIG. 13, the seal 900 moves toward the position in FIG. 14. Any excess air or pressure built up in cavity 22 is permitted to vent past the gap between the static seal 838 and the surface 32, through the passageway 894 and past the lip 191, as shown in FIGS. 13 and 15. When the seal 900 is in its assembled condition, as shown in FIG. 14, the static seal 838 sealingly engages surface 32, as shown in FIG. 16, and the cavity 22 is sealed. When this occurs, the seal 192 no longer permits venting since the static seal 838 prevents any pressure or gas to flow into passageway 894. Since the passageway 894 is sealed at both ends, the seal will still be effective if either of the static seals subsequently fails. In all other aspects the function of seal 900 is the same as seal 100.

While the invention has been described in connection with a preferred and alternate embodiments, it will be understood that it is not intended to limit the invention to those embodiments only. On the contrary, it is intended to cover all alternative modifications and equivalents that may be included within the spirit and scope of the invention as defined by the appended claims.

What I claim is:

1. A universal joint seal for retaining lubricant therein comprising:

a trunnion;

a seal cooperating with said trunnion, said seal having an inner portion, an outer portion, and a flexible web portion between said inner portion and said outer portion, said inner portion contiguous with said trunnion;

a bearing cup cooperating with said outer portion of said seal, said bearing cup spaced away from said trunnion and forming a cavity to contain lubricant therein;

said flexible web portion of said seal permitting relative motion between said bearing cup and said trunnion;

wherein said inner portion of said seal having a passage communicating with said cavity, said inner portion further having a lip contacting said trunnion so that in one predetermined condition said lip is arranged to provide a fluid barrier to the migration of lubricant from said passage and along said trunnion and in another predetermined condition said lip moves away from said trunnion in response to a moderate pressure level within whereby said lip preventing the formation of an excess pressure level in said cavity.

2. A universal joint seal as claimed in claim 1 wherein said flexible portion having at least one convoluted portion.

3. A universal joint seal as claimed in claim 1 wherein said seal being formed of an elastomeric material.

4. A universal joint seal as claimed in claim 3 wherein said elastomeric material consisting of the group of nitrile, hydrogenated nitrile, silicone, ethylene acrylate, fluorocarbon and polyacrylate.

5. A universal joint seal as claimed in claim 1 wherein said inner portion further having a plurality of rubber bumpers to facilitate assembly of said seal to said trunnion and bearing cup.

6. A universal joint seal as claimed in claim 1 wherein said lip having an outward facing portion communicating with said cavity.

7. A universal joint seal as claimed in claim 1 wherein said seal having a chamber between said lip on said inner portion and said passage.

8. A seal for sealing a lubricant within a cavity in a universal joint, said universal joint having a trunnion and a bearing cup in spaced relationship to said trunnion, said seal comprising:

a first case adjacent to the trunnion;

a second case adjacent to the bearing cup;

an elastomeric member cooperating with said first case and second case, said elastomeric member having a first portion between the trunnion and said first case, a second portion between the bearing cup and said second case, and a web portion extending from said first portion to said second portion, said web portion permitting relative movement between the trunnion and the bearing cup.

9. A seal as claimed in claim 8 wherein said first portion having a lip seal contacting the trunnion, said lip seal forming a barrier to passage of lubricant along the trunnion but separable from t trunnion in response to a moderate. pressure level within the cavity so as to enable pressure on each side of said lip seal to generally equalize.

10. A seal as claimed in claim 9 further comprising:

at least one rubber bumper between said first case and said bearing cup.

11. A seal as claimed in claim 10 wherein said rubber bumper member mounts on the outer diameter of the bearing cup to facilitate assembly of said trunnion and said bearing cup.

12. A seal as claimed in claim 9 wherein said lip seal being outwardly facing of said cavity.

13. A seal as claimed in claim 9 wherein said lip seal having a groove, said groove being axially disposed adjacent to the trunnion.

14. A seal for a universal joint, said universal joint having a trunnion and a bearing cup in spaced relation to said trunnion, said trunnion and bearing cup defining a cavity for retaining lubricant therein, said seal comprising:

an elastomer member adjacent to said trunnion, said elastomer member having an inner portion, an outer portion and a flexible web portion between said inner portion and outer portion, said elastomer member further defining a passage communicating with the cavity, said outer portion adjacent to said bearing cup, said flexible web portion permitting relative motion between the trunnion and the bearing cup.

15. A seal as claimed in claim 14 wherein said elastomer member further having a lip portion normally contacting the trunnion so that in one predetermined condition, said lip portion forming a barrier to the passage of lubricant along the trunnion but separable from the trunnion in response to a moderate pressure level within the cavity so as to prevent an excessive pressure differential from developing across said lip.

16. A seal as claimed in claim 14 wherein said inner member having a static seal in sealing cooperation with the trunnion.

17. A seal as claimed in claim 16 wherein said passageway is formed in said static seal of said inner portion.

18. A seal as claimed in claim 14 wherein said outer member having a static seal in sealing cooperation with the bearing cup.

19. A seal as claimed in claim 14 wherein the bearing cup having a shoulder portion and said outer portion having an axial extension adjacent to said shoulder portion.

20. A seal for a universal joint with a trunnion and a bearing cup, said trunnion and bearing cup forming a cavity and a roller bearing in said cavity, said seal comprising:

an inner member adjacent to the trunnion, said inner member having rubber cushion adjacent to the roller bearing, a lip seal, and at least one axial groove formed between said lip seal and said cushion;

an outer member adjacent to the bearing cup; and a rubber portion between said inner and outer members, said webbed portion permitting relative movement between the trunnion and the bearing cup.

21. A seal as claimed in claim 20 wherein said rubber cushion having an inner surface, said inner surface having plurality of passages formed on its inner surface.

22. A seal as claimed in claim 21 wherein said passages comprise shapes which are quadrilateral, sawtoothed, sinusoidal and rectangular.

23. A seal as claimed in claim 22 wherein said lip seal forming a barrier to the passage of lubricant along the trunnion but separable from the trunnion in response to a moderate pressure level within the cavity.

24. A seal for a universal joint with a trunnion and a bearing cup, said trunnion and said bearing cup forming a cavity, said cavity having a plurality of roller bearings therein, said seal comprising:

an inner member adjacent to the trunnion, said inner member having a rubber cushion adjacent to at least one of the plurality of rollers;

an outer member adjacent to the bearing cup; and a webbed portion between said inner and outer members, said webbed portion permitting relative movement between the trunnion and the bearing cup.

25. A seal as claimed in claim 24 comprising;

a washer interposed between said rubber cushion and at least one of the plurality of rollers.

26. A seal as claimed in claim 25 including at least one lubricious washer interposed between said rubber cushion and at least one of the plurality of rollers.

27. A seal as claimed in claim 24 wherein said rubber cushion having a surface adjacent to the cavity, said surface having a plurality of passages.

28. A seal as claimed in claim 24 wherein said plurality of passages comprise apertures which consist of quadrilateral, rectangular, sawtoothed, triangular, and sinusoidal shapes.

29. A seal as claimed in claim 24 wherein said seal lip contacting said trunnion in one predetermined condition to provide a barrier to the migration of lubricant between said seal lip and the trunnion and in another predetermined condition said seal lip moves away from the trunnion in response to an increase in pressure in the cavity.

30. A seal for a universal joint with a trunnion and a bearing cup said trunnion and said bearing cup forming a cavity, said cavity having a plurality of roller bearings therein, a first surface and a second surface radially of said first surface, said seal comprising:

an inner member adjacent to the bearing cup;

a webbed portion between said inner and outer members, said webbed portion preventing relative movement between the ton and the bearing cup;

said inner member being disposed in a first condition adjacent to said first surface of said cavity to permit venting from said cavity and disposed in a second condition adjacent to said second surface of said cavity to prevent venting from said cavity.

* * * * *

UNITED STATES PATENT AND TRADEMARK OFFICE
CERTIFICATE OF CORRECTION

PATENT NO. : 6,601,855 B1
DATED : August 5, 2003
INVENTOR(S) : Keith A. Clark

It is certified that error appears in the above-identified patent and that said Letters Patent is hereby corrected as shown below:

<u>Title page,</u>
Insert Item -- [73] Assignee: Freudenberg-NOK General Partnership, Plymouth, MI (US) --.
Insert Item -- [74] *Attorney, Agent or Firm*, Ronald W. Wangerow --.

Signed and Sealed this

Eleventh Day of November, 2003

JAMES E. ROGAN
*Director of the United States Patent and Trademark Office*